(12) United States Patent
Barnett (10) Patent No.: US 11,258,936 B1
(45) Date of Patent: Feb. 22, 2022

(54) REMOTE SELFIE SYSTEM

(71) Applicant: Katherine Barnett, Mill Valley, CA (US)

(72) Inventor: Katherine Barnett, Mill Valley, CA (US)

( * ) Notice: Subject to any disclaimer, the term of this patent is extended or adjusted under 35 U.S.C. 154(b) by 0 days.

(21) Appl. No.: 16/948,870

(22) Filed: Oct. 3, 2020

(51) Int. Cl.
| | | |
|---|---|---|
| *H04N 5/232* | (2006.01) | |
| *H04N 5/225* | (2006.01) | |
| *G06F 3/044* | (2006.01) | |
| *G06F 3/0354* | (2013.01) | |
| *H04M 1/02* | (2006.01) | |

(52) U.S. Cl.
CPC ..... *H04N 5/23203* (2013.01); *G06F 3/03545* (2013.01); *G06F 3/0442* (2019.05); *H04N 5/2253* (2013.01); *H04N 5/23293* (2013.01); *H04N 5/23299* (2018.08); *H04M 1/0202* (2013.01)

(58) Field of Classification Search
CPC ........... H04N 5/23203; H04N 5/23299; H04N 5/2253; H04N 5/23293; G06F 3/0442; G06F 3/03545; H04M 1/0202
USPC ...................................................... 348/211.4
See application file for complete search history.

(56) References Cited

U.S. PATENT DOCUMENTS

| | | | | |
|---|---|---|---|---|
| 10,044,921 B2 * | 8/2018 | Morita | ............... | H04M 1/72415 |
| 10,178,209 B1 * | 1/2019 | Hesse | .................... | H04M 1/04 |
| 10,368,003 B2 * | 7/2019 | Hayashi | ............. | H04N 5/23216 |
| 10,582,119 B2 * | 3/2020 | Hegde | ....................... | G06K 9/42 |
| 2003/0193588 A1 * | 10/2003 | Yuen | ................... | F16M 11/2014 |
| | | | | 348/275 |
| 2004/0135879 A1 * | 7/2004 | Stacy | ................. | G08B 21/0208 |
| | | | | 348/14.02 |
| 2012/0239396 A1 * | 9/2012 | Johnston | ................ | H04N 21/47 |
| | | | | 704/235 |
| 2013/0335587 A1 * | 12/2013 | Takatsuka | ........ | H04N 5/232945 |
| | | | | 348/211.4 |
| 2016/0044227 A1 * | 2/2016 | Johnson | ............... | H04B 1/3888 |
| | | | | 348/211.2 |
| 2016/0077410 A1 * | 3/2016 | Lytle | ...................... | F16M 11/34 |
| | | | | 348/211.2 |
| 2016/0105598 A1 * | 4/2016 | Zeira | .................... | H04N 5/2252 |
| | | | | 348/143 |
| 2016/0253552 A1 * | 9/2016 | Rihn | ....................... | G06F 3/015 |
| | | | | 382/224 |
| 2016/0269648 A1 * | 9/2016 | Hayashi | ............. | H04N 5/23206 |
| 2017/0187946 A1 * | 6/2017 | Kozakura | ............ | H04N 1/4433 |
| 2018/0054561 A1 * | 2/2018 | Morita | ..................... | H04N 7/15 |
| 2019/0037135 A1 * | 1/2019 | Hedge | ................. | G06K 9/00228 |
| 2019/0075922 A1 * | 3/2019 | Rivera | .................... | G06N 5/046 |
| 2019/0215457 A1 * | 7/2019 | Enke | .................... | H04N 5/23258 |

(Continued)

*Primary Examiner* — Pritham D Prabhakher
(74) *Attorney, Agent, or Firm* — Thomas VanZandt (57) ABSTRACT

A remote selfie system is disclosed. A control mobile computing system is communicatively coupled to an imaging mobile computing system having a digital imaging functionality. Commands are exchanged to allow the control mobile computing system to remotely control the digital imaging functionality of the imaging mobile computing system. The control mobile computing system receives a digital image to be captured by the digital imaging functionality of the imaging mobile computing system. The control mobile computing system send commands to the imaging mobile computing system to capture a digital image.

10 Claims, 6 Drawing Sheets

(56) References Cited

U.S. PATENT DOCUMENTS

2020/0137292 A1\* 4/2020 Liang .................... G08C 17/02
2021/0067687 A1\* 3/2021 Matsuda ............. G06F 16/5866

\* cited by examiner

```
┌─────────────────────────────────────────────────────────┐
│ Communicatively Couple a Control Computing System and an│
│ Imaging Computing System Having Digital Imaging         │
│ Functionality.                                          │
│                                                     405 │
└─────────────────────────────────────────────────────────┘
                            ↓
┌─────────────────────────────────────────────────────────┐
│ Transmit Commands and Data Between the Control Computing│
│ System and the Imaging Computing System to Allow the    │
│ Control Computing System to Remotely Control the Digital│
│ Imaging Functionality of the Imaging Computing System.  │
│                                                     410 │
└─────────────────────────────────────────────────────────┘
                            ↓
┌─────────────────────────────────────────────────────────┐
│ Receive, from the Imaging Computing System, a Digital   │
│ Image to be Captured by the Digital Imaging             │
│ Functionality of the Imaging Computing system.          │
│                                                     415 │
└─────────────────────────────────────────────────────────┘
                            ↓
┌─────────────────────────────────────────────────────────┐
│ Transmit Commands from the Control Computing System to  │
│ the Imaging Computing System to Modify the Digital Image│
│ to be Captured by the Digital Imaging Functionality of  │
│ the Imaging Computing System.                           │
│                                                     420 │
└─────────────────────────────────────────────────────────┘
                            ↓
┌─────────────────────────────────────────────────────────┐
│ Transmit Commands from the Control Computing System to  │
│ the Imaging Computing System to Capture a Digital Image.│
│                                                     425 │
└─────────────────────────────────────────────────────────┘
```

FIG. 4

Computer-Readable Storage Medium 500

Digital Image Capture through Remote Activation and Control of Digital Imaging Functionality
502

Communicatively Coupling a Control Computing System with a Digital Imaging Computing System
504

Remotely Activating and Controlling a Digital Imaging Functionality of the Digital Imaging Computing System to Determine a Digital Image to be Captured
506

Remotely Activating the Image Capture Functionality of the Digital Imaging Computing System to Capture a the Determined Digital Image.
508

REMOTE SELFIE SYSTEM

FIELD

Examples of the invention relate generally to the field of portable imaging devices and more specifically to the use of cell phone cameras for taking selfies.

BACKGROUND

With the increase of social media over the past twenty years, there has been a marked increase in taking selfies which are digital images taken of oneself, and perhaps others, typically with a camera functionality of a cellphone. Selfies can be taken by holding the camera at arm's length away from the subject, but the short shooting distance limits what can be captured. Additionally, many users are not able to steady the cell phone sufficiently when held at arm's length which reduces the clarity of the image.

Conventional selfie sticks are basically a telescoping pole that attaches to the cell phone or camera so that the camera can be held at a desired position greater than arm's length. By extending the shooting distance, selfie sticks allow more of the subject and background to be captured. However, like the arm's length selfie method, selfie sticks are also difficult to hold steady. Additionally, selfie sticks can only be so long (approximately one meter), before they are too cumbersome to use. Moreover, many locations at which a user may desire to take a selfie have banned selfie sticks because they may be hazardous or disruptive to others. Selfie sticks often require assembly which is time consuming and the components may deform with repeated assembly, use, and disassembly.

Another disadvantage of both the arm's length selfie method and selfie sticks is that it is difficult for a user to adequately discern many typical image considerations such as focus, camera angle, composition, balance, and shading. As a result, many selfies are not satisfactory.

Cameras have improved and can produce clearer, higher quality images at greater distances. Users may want selfies that are taken from greater distances than a selfie stick can, practically, extend. Users may want to capture more background or include more people in the image. For example, two friends who want to take a selfie while socially distancing would require the typical cell phone camera to be placed at a distance beyond what a conventional selfie stick could accommodate.

Another difficulty with conventional selfie schemes is that it is difficult to discern what image will be captured by the cell phone. Even when a conventional cell phone camera is in selfie mode, when holding the camera or the selfie stick it is often difficult for the user to see the image that will be captured. This may be due to the camera being at a distance or may be due to movement caused by not being held steady, or both.

These and other disadvantages of conventional selfie methods and devices may be addressed by the features, components, and concepts described herein.

BRIEF DESCRIPTION OF THE DRAWINGS

The following detailed description of examples of the present disclosure, is better understood when read in conjunction with the appended drawings. For the purpose of illustrating this disclosure, there is shown in the drawings, exemplary constructions of the invention; however, the invention is not limited to the specific features disclosed. In the drawings.

DETAILED DESCRIPTION

Examples of the present disclosure provide a remote selfie system that addresses some disadvantages of a conventional selfie stick. For one example, a remote selfie system (RSS) provides a remote activation device (RAD) for activating a camera functionality of a conventional mobile communication device (e.g., mobile phone (e.g., cell phone), PDA, etc.).

The remote activation device may be communicatively coupled to, for example, a user's cell phone. The remote activation device may allow the user to remotely activate the camera functionality of a cell phone from a distance of several meters and allows the cell phone to provide information to the remote activation device regarding the camera functionality of the cell phone. The remote activation device may be coupled to the cell phone via Bluetooth or other methods of wireless communication and control. The remote activation device receive information from the cell phone regarding a digital image to be captured by the camera functionality of the cell phone, for example, the cell phone may communicate information that the camera functionality is activated and properly focused. For one example, the cell phone may communicate the image to be captured, and the remote activation device may include a display screen which may display the image to be captured by the camera functionality of the cell phone to the user. This allows the user to make adjustments prior to capturing the image. For one example, the RSS includes an RSS application (e.g., a software application) running on one or more mobile phones or other imaging devices that allows one mobile device to remotely activate, operate, and control the imaging functionality of another mobile device. For one example, the RSS application allows a user to link her cell phone to another cell phone and allows the user to designate one cell phone as the remote activation device and the other cell phone as the imaging device.

For one example the RSS includes a cell phone stand for positioning the cell phone. The stand generally accommodates the cell phone and may be adjustable to accommodate various cell phone designs or may be specific to a particular cell phone design. For some such examples, the stand may include cell phone positioning functionality that may include remotely controlled actuators for fine positioning of the cell phone prior to recording an image (taking a selfie). The actuators may be remotely controlled by a remote activation device of the RSS. The stand may include cell phone camera activation functionality which may be, for example, a remote activation mechanism for pressing the camera activation button on the cell phone. The remote activation mechanism may be a remotely activated stylus, such as a capacitive stylus or may be other appropriate means for activating the image capture functionality of the cell phone camera.

Examples of the invention may have some or all of these features and may be implemented in various ways, some examples of which are described below.

Reference throughout the specification to "one example" or "an example" means that a particular feature, structure, or characteristic described in connection with the example is included in at least one example of the present invention. Thus, the appearance of the phrases "in one example" or "in an example" in various places throughout the specification are not necessarily all referring to the same example. Furthermore, the particular features, components, structures, or characteristics may be combined in any suitable manner in one or more examples.

Moreover, inventive aspects lie in less than all features of a single disclosed example. Thus, any claims following the Detailed Description are hereby expressly incorporated into this Detailed Description, with each claim standing on its own as a separate example of this invention.

Examples of the invention are suitable for a variety of applications in which digital images are captured including applications in which digital cameras are used to take selfies. Such applications include, but are not limited to, remotely activating a camera of a cell phone to take a selfie.

Remote Activation Device

Figure 1:
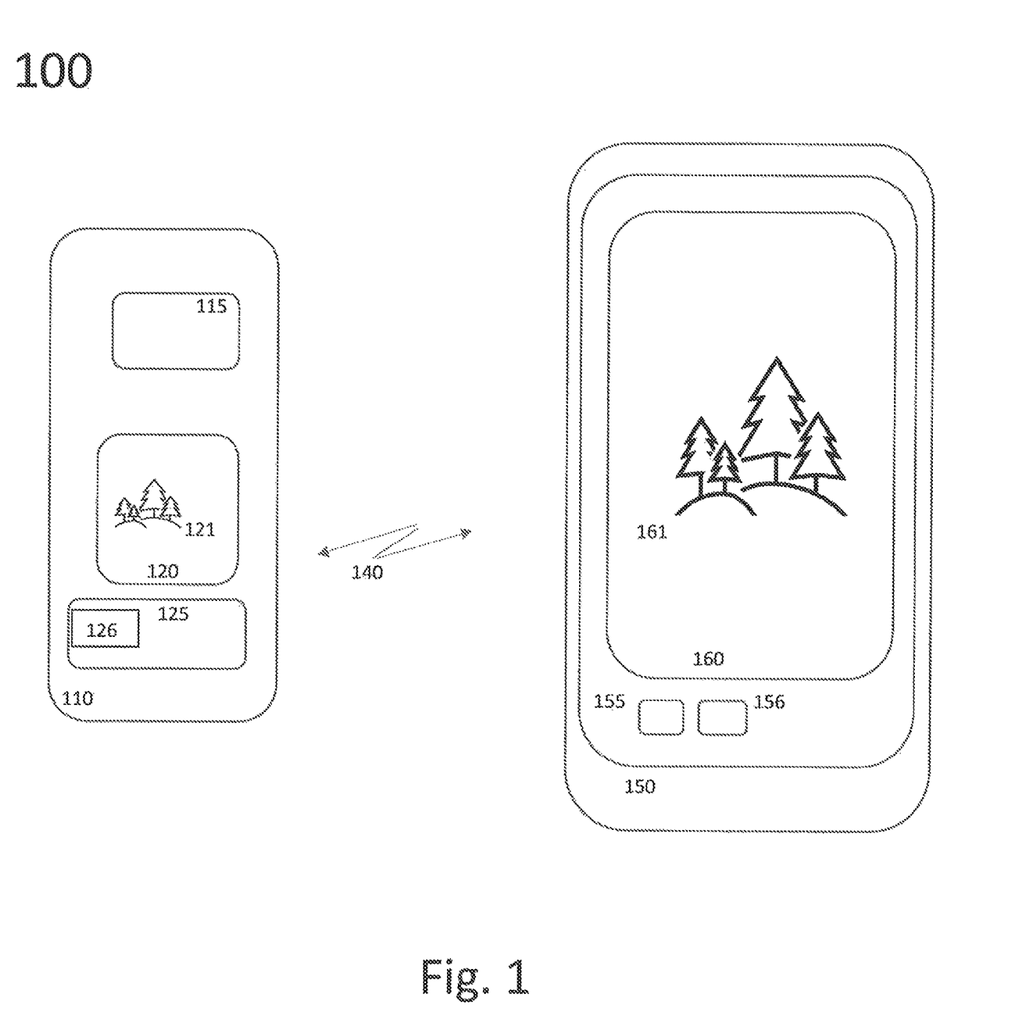
FIG. 1 illustrates a system in accordance with one example of the present disclosure.

FIG. 1 illustrates a system in accordance with one example of the invention. System 100, shown in FIG. 1, may include a remote activation device (RAD) 110. The RAD 110 may be communicatively coupled to a digital imaging device (DID) 150. DID 150 may be the user's mobile phone or any other similar type of portable computing or communication device including a smart phone (e.g. iPhone, Android, etc.), a laptop or tablet computing device or a digital camera with communication capability. The RAD 110 may include remote activation functionality (RAF) 115. The RAD 110 may be communicatively coupled to the DID 150 via wireless communication signal 140. This may allow the RAF 115 to activate the DID 150 and may allow the RAD 110 to receive information from the DID 150 regarding a digital image to be captured by the digital imaging functionality of the DID 150. In some examples, the wireless connection between RAD 110 and DID 150 may be effected using Bluetooth. For some examples, other protocols or any other suitable means for providing wireless communication and control may be used.

RAD 110 may include one or more control buttons 125 that may include activation mechanism 126. The control buttons 125 may be used to turn on the user's mobile phone (e.g., DID 150) and to activate a digital imaging functionality (e.g., camera function) of the user's mobile phone via the remote activation application 155 of DID 150

In practice, when taking a selfie, the user's phone and camera functionality may be initially activated and the activation mechanism 126 may be used to capture a digital image.

Generally, a user may activate (turn on) their cell phone and activate the camera functionality of their cell phone. The user would then position the cell phone in a desired location to take a selfie. The user would then initiate communication between the remote activation device and the cell phone to receive information regarding the camera functionality including the selfie to be captured by the camera functionality. The user would then remotely activate the image capture function of the cell phone camera.

Figure 2:
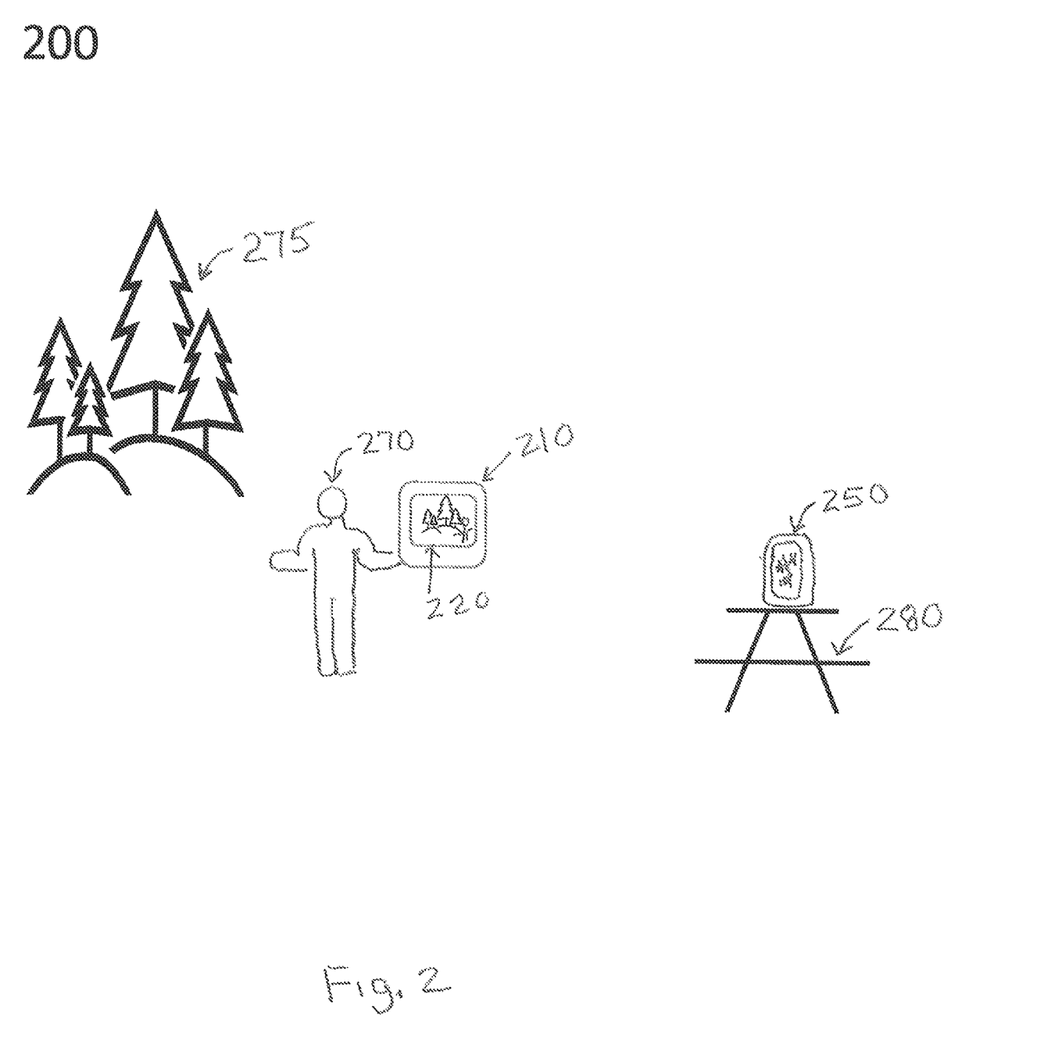
FIG. 2 illustrates use of a display screen of a remote activation device in accordance with one example of the present disclosure.

For one example, the RAD 110 may include a display screen 120. A digital image transmission application 156 of the DID 150 may cause the image that is to be captured by the camera functionality of the DID 150 as displayed on the display screen 160 of the DID 150 (i.e., image 161) to be displayed on display screen 120 of the RAD 110. As shown in FIG. 1, the display screen 160 of the DID 150 displays image 161. Image 161 is transmitted to the RAD 110 and displayed on display screen 120 as image 121. This display aids the user in comprehending the image that will be captured by the DID 150 and to adjust focus, balancing, shading, and camera position to obtain a desired selfie image. In some examples, when a user has adjusted the digital image, the user may activate the digital imaging FIG. 2 illustrates use of a display screen of a remote activation device in accordance with one example of the invention. Scene 200, shown in FIG. 2 depicts a user 270 standing between trees 275 and a park table 280. The user 270 is holding a RAD 210. The user's DID 250 is set on a park table 280. Upon remote activation of the camera functionality of the DID 250, the image to be captured by the DID 250 will be displayed on display screen 220 of the RAD 210 as shown. The selfie image contains the entire scene, including the user, the tree, and the surrounding park. The user can see the image that will be captured and can make adjustments to focus, balancing, shading, etc.

Selfie Cell Phone Stand

With conventional selfie methods and devices, the cell phone camera is positioned by the user prior to capturing a selfie image. Conventionally, the user is holding the cell phone camera or holding the selfie stick to which the cell phone camera is attached. In accordance with some examples of the present disclosure, the cell phone camera is remote from the user when capturing the selfie image. In accordance with some examples a selfie stand is used to aid in positioning the cell phone camera in a desired position to capture a desired selfie image.

Figure 3:
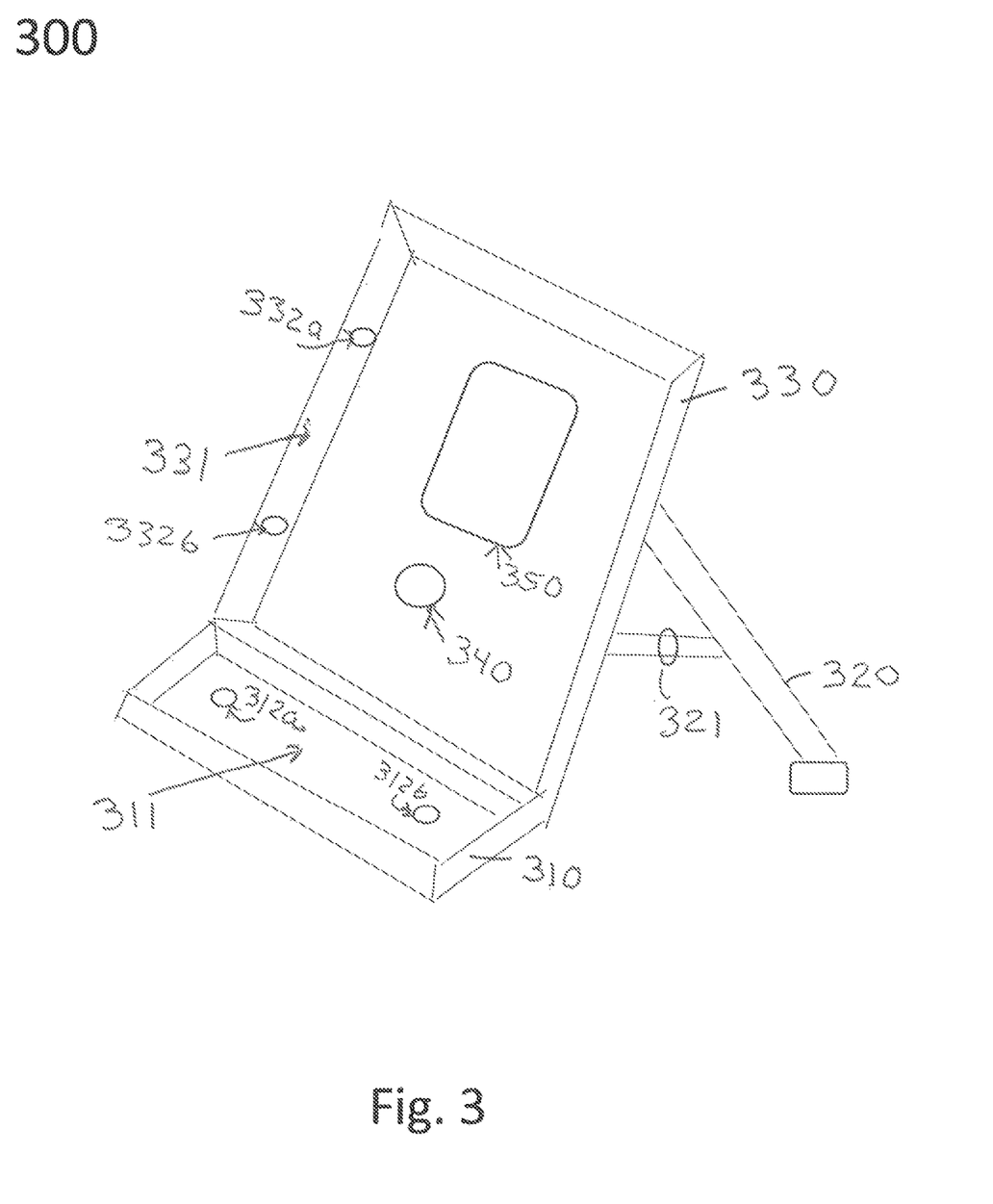
FIG. 3 illustrates a cell phone stand in accordance with some examples of the present disclosure.

FIG. 3 illustrates a cell phone stand in accordance with one example of the invention. The cell phone stand 300, shown in FIG. 3 may have various configurations of conventional cell phone stands. In accordance with some examples, the cell phone stand incorporates a computing system that is communicatively coupled to a remote activation device as described above. As shown, cell phone stand 300 has a base portion 310 which forms a reception area for receiving the cell phone. Cell phone stand 300 also has a balance leg 320 and a panel portion 330. For some examples, the cell phone stand 300 may include remotely controlled cell phone positioning functionality. For example, each of the base portion 310, the balance leg 320, and the panel portion 330 may have associated actuators that may be controlled by the RAD for adjusting the position of a cell phone placed in the stand. For example, base portion 310 may have a bottom portion 311 which may have actuators 312a and 312b that can be used to raise or lower a cell phone placed in the stand to make longitudinal adjustments. Likewise, panel portion 330 may have sidewalls, shown, for example as sidewall 331 which may have actuators, shown for example as actuators 332*a* and 332*b* that may be used to adjust the placement of a cell phone in the stand for vertical adjustment. The balance leg 320 may have an actuator 321 that may be used to adjust the placement of the balance leg 320 thereby changing the angle of a cell phone placed in the stand for transverse adjustment. Other portions of the cell phone stand 300 may also have actuators (not shown) to adjust the position of a cell phone placed in the cell phone stand 300. In use, the cell phone may be placed in the stand and the stand placed appropriately for the desired selfie. When the camera functionality of the cell phone is activated, the user can view the image that will be captured using the RAD, as discussed above. The user may use the RAD to remotely activate the actuators of the cell phone stand to adjust the position of the cell phone within the stand as desired.

For some examples, the cell phone stand 300 may include remotely controlled cell phone camera activation functionality. For example, the cell phone stand 300 may include a remotely controlled camera activation mechanism, shown for example as remote camera activation mechanism 340. The remotely controlled camera activation mechanism 340 may be remotely controlled by the RAD to press the camera activation button on the cell phone. The remotely controlled camera activation mechanism 340 may be a remotely activated stylus, such as a capacitive stylus or may be other appropriate means for activating the image capture functionality of the cell phone camera using the RAD.

For some examples, the cell phone stand 300 may include a digital imaging and transmission mechanism 350 that provides digital imaging and transmission functionality which may be remotely controlled by the RAD to obtain and transmit an image to be captured by a camera of a cell phone placed in the cell phone stand 300. This may allow the RAD device to receive the image to be captured by a cell phone camera without being communicatively coupled to the cell phone.

Remote Selfie Application

As noted above, for some examples of the present disclosure, the RAD is another cell phone and each cell phone (i.e., the cell phone functioning as the RAD and the cell phone providing the DID) has an RSS application that allows the phone to be used as a RAD of a designated phone.

Figure 4:
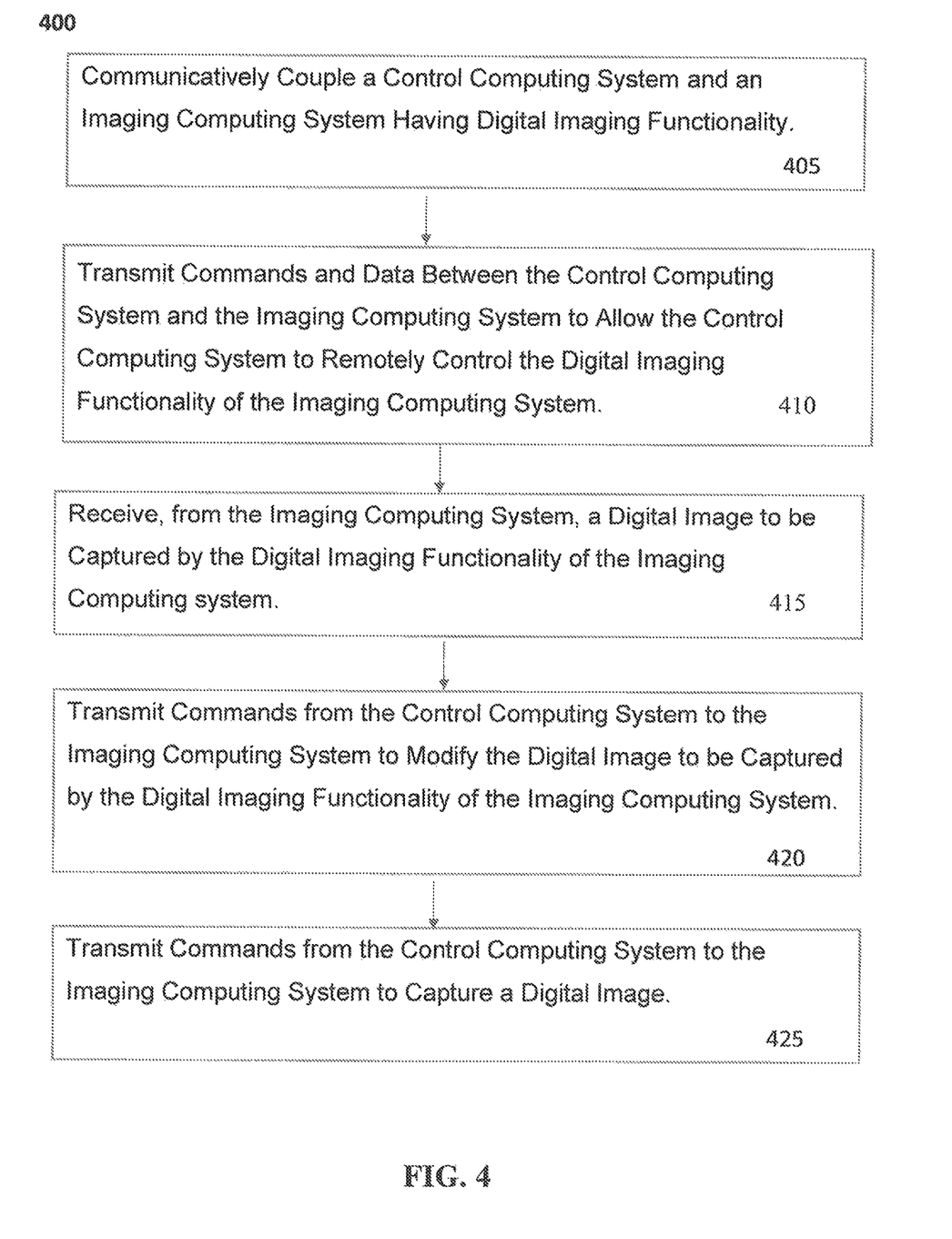
FIG. 4 illustrates a process in which a selfie image is captured by using a control computing system to remotely control a digital imaging functionality of an imaging computing system in accordance with one example of the present disclosure.

FIG. 4 illustrates a process in which a selfie image is captured by using a control computing system to remotely control a digital imaging functionality of an imaging computing system in accordance with one example of the present disclosure. For one example, a first mobile computing system is used to remotely activate a digital imaging device of a second mobile computing system. Process 400, shown in FIG. 4 begins with operation 405 in which a first mobile computing system (e.g., control computing system) may be communicatively coupled to a second mobile computing system having a digital imaging functionality (e.g., imaging computing system). For one example of the present disclosure, once two computing systems are communicatively coupled, the Remote Selfie Application may query a user as to which computing system will be the control computing system and which will be the imaging computing system.

At operation 410, commands and data may be transmitted or exchanged between the control computing system and the imaging computing system to allow the control computing system to remotely control the digital imaging functionality of the imaging computing system. Such commands and data may be transmitted between the control computing system and the imaging computing system or may be received by the control computing system and/or the imaging computing system from another source (e.g., a cloud-based server).

At operation 415 the control computing system may receive, from the imaging computing system, a digital image to be captured by the digital imaging functionality of the imaging computing system. The digital image to be captured by the digital imaging functionality of the imaging computing system may be transmitted to the control computing system and may be displayed on a display screen of the control computing system.

At operation 420 the control computing system may transmit commands to the imaging computing system to adjust or modify the digital image to be captured by the digital imaging functionality of the imaging computing system. If the user is satisfied with the digital image to be captured, no commands to adjust or modify the digital image may be transmitted.

At operation 425 the control computing system may send commands to the imaging computing system to capture a digital image.

Figure 5:
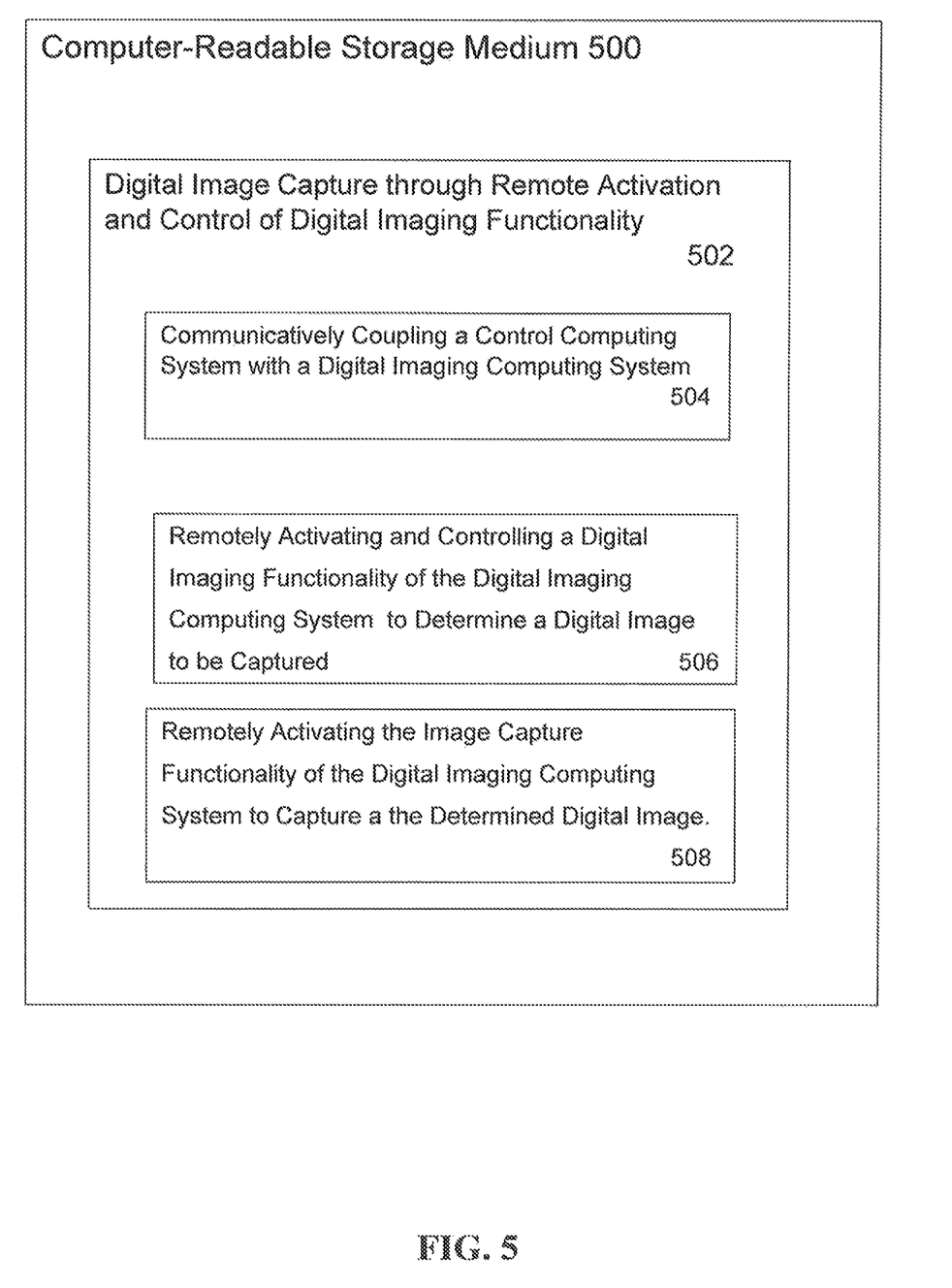
FIG. 5 illustrates example instructions stored on an example non-transitory computer-readable storage medium to implement the capture of a selfie image using a control computing system to remotely control a digital imaging functionality of an imaging computing system in accordance with one example of the present disclosure.
Figure 6:
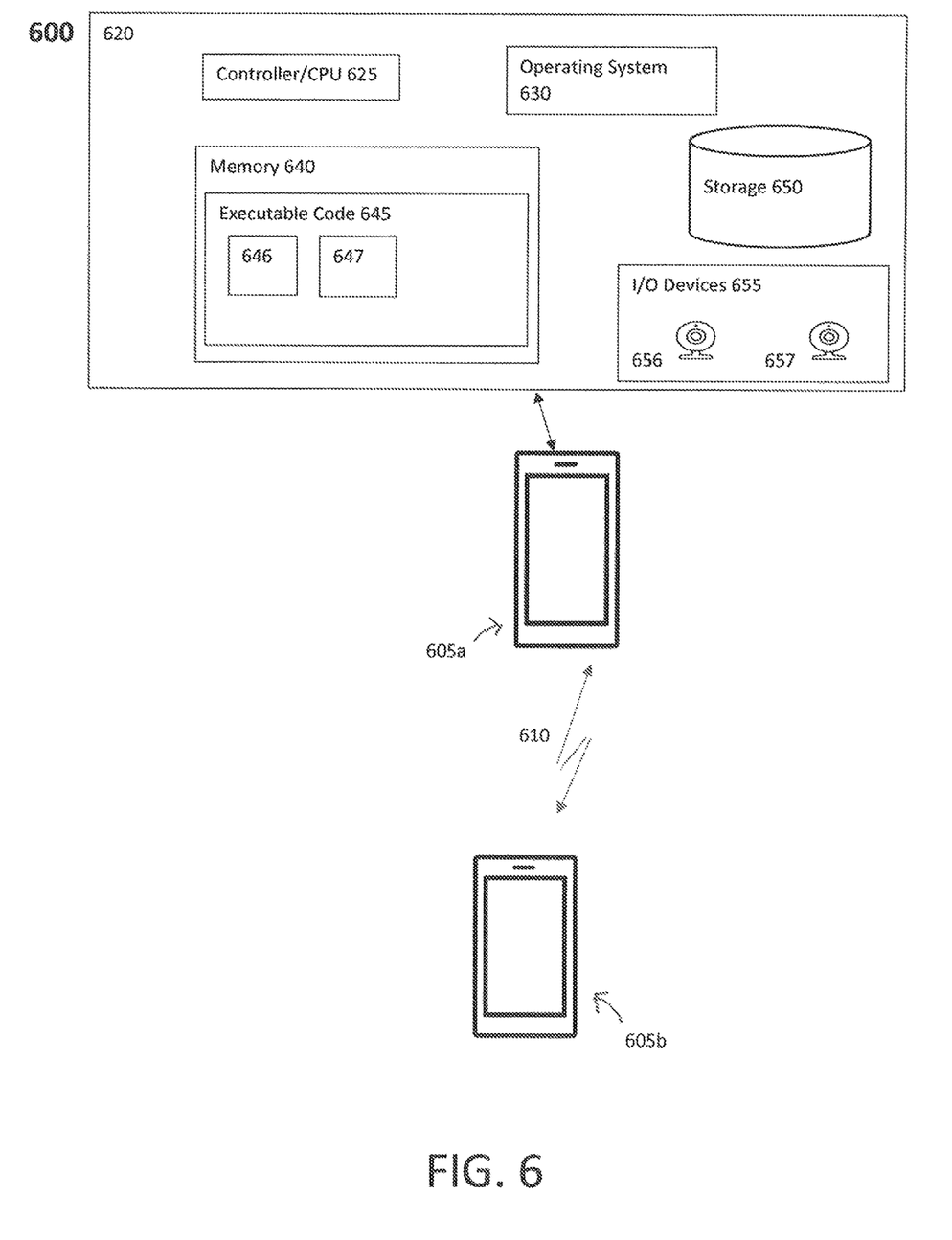
FIG. 6 illustrates an example remote selfie system that may be used to implement the remote activation of a digital imaging functionality of an imaging computing system according to some examples of the present disclosure.

FIG. 5 illustrates example instructions stored on an example non-transitory computer-readable storage medium to implement the capture of a selfie image using a control computing system to remotely control a digital imaging functionality of an imaging computing system in accordance with one example of the present disclosure. FIG. 6 illustrates an example remote selfie system 600 that may be used to implement the remote activation of a digital imaging functionality of an imaging computing system according to some examples of the present disclosure.

As shown in FIG. 5, the non-transitory computer-readable storage medium 500 includes instruction 502 that may cause a processor (e.g., CPU 625 of FIG. 6) to effect the capture of a digital image (e.g., selfie image) through use of a control computing system (e.g., cell phone 605*a* of FIG. 6) to remotely activate and control a digital imaging functionality of an imaging computing system (e.g., cell phone 605*b* of FIG. 6) in accordance with one example of the present disclosure as described in further detail below.

The non-transitory computer-readable storage medium 500 may be any electronic, magnetic, optical, or other physical storage device that stores executable instructions. For example, the non-transitory computer-readable storage medium 500 may be a random access memory (RAM), an electrically-erasable programmable read-only memory (EEPROM), a storage drive, an optical disc, or the like. The non-transitory computer-readable storage medium 500 may be encoded to store executable instructions that cause a processor to perform operations according to examples of the disclosure.

Instruction 502 may include instruction 504, instruction 506 and instruction 508 to implement the remote activation and control of a digital imaging functionality of a digital image device (e.g., cell phone) according to examples of the present disclosure.

Instruction 504 may cause a processor to perform the operation of communicatively coupling a control computing system with a digital imaging computing system. For some examples, communicative coupling of a control computing system with a digital imaging computing system may be effected using Bluetooth or other wireless technology standards for exchanging data between mobile devices. For some examples, the communicative coupling is initiated from the control computing system.

Instruction 506 may cause the processor to perform the operation of the control computing system remotely activating and controlling a digital imaging functionality of the digital imaging computing system. For some examples, controlling the digital imaging functionality allows a determination of a digital image to be captured. For some examples, instruction 506 may cause the processor to perform the operation of the control computing system receiving, from the digital imaging computing system, a digital image to be captured by the digital imaging computing system and displaying the received digital image on a display screen of the control computing system.

For some examples, instruction 506 may cause the processor to perform the operation of the control computing system remotely adjusting a digital image to be captured by the digital imaging computing system.

Instruction 508 may cause the processor to perform the operation of the control computing system remotely activating the image capture functionality of the digital imaging computing system to capture a determined digital image.

Referring again to FIG. 6 which illustrates an example remote selfie system 600 that may be used to implement the remote activation of a digital imaging functionality of an imaging computing system according to some examples of the present disclosure: The remote selfie system 600, shown in FIG. 6, includes control computing system 605a, shown, for example as cell phone 605a, and an imaging computing system 605b, shown, for example as cell phone 605b. The computing systems 605a and 605b are communicatively coupled to each other by way of a communication link 610 (e.g., Bluetooth). According to examples of the present disclosure, computing systems may include or may be, for example, a cell phone, a mobile computer, a laptop computer, a dedicated remote activation device, a network device, or any other suitable computing device.

As shown in FIG. 6, each of the computing systems 605a and 605b may include computing component 620. Computing component 620 may include a controller/CPU 625 that may be, for example, a CPU, a chip or any suitable computing or computational device. Computing component 620 may include an operating system 630, a memory 640, executable code 645, and a storage system 650 that may include input/output (I/O) devices 655.

Controller/CPU 625 may be configured to carry out methods described herein and/or to execute various modules. Each of the computing systems 605a and 605b may include more than one computing component 620. One or more computing components 620 may act as the components of a computing system according to examples of the present disclosure.

Operating system 630 may be, or may include, any code designed and/or configured to perform tasks involving controlling or otherwise managing operation of computing component 620. This may include scheduling execution of software programs or enabling software programs or other modules or units to communicate. As an example, operating system 630 may be a commercial operating system. For some examples of the disclosure, the computing component 620 may include a computing device that does not use an operating system (e.g., a microcontroller, ASIC, FPGA, or SOC).

Memory 640 may be implemented in various forms including random access memory (RAM), read-only memory (ROM), volatile or non-volatile memory, a cache memory, or other suitable memory units or storage units. Memory 640 may be a computer-readable non-transitory storage medium.

Executable code 645 may be any executable code, e.g., an application, a program, or a process. Executable code 645 may be executed by controller/CPU 625 possibly under control of operating system 630. Examples of the present disclosure may include a plurality of executable code that may be loaded into memory 640 and cause controller/CPU 625 to carry out methods described herein.

Storage system 650 may be or may include, for example, a hard disk drive, flash memory, a micro controller-embedded memory, or removable storage. Content may be stored in storage system 650 and may be loaded from storage system 650 into memory 640 where it may be processed by controller/CPU 626. Although shown as a separate component, storage system 650 may be embedded or included in memory 640.

I/O devices 655 may include any suitable input devices such as a keyboard/keypad, audio/visual input, and any suitable output devices such as audio/visual displays or monitors. As shown in FIG. 6, the I/O devices 655 of the remote selfie system 600 may include one or more cameras shown, for example as camera 656, and camera 657. A universal serial bus (USB) device or external hard drive may be included in I/O devices 655. Any applicable I/O devices may be connected to computing component 620 by, for example, a wired or wireless network interface.

As discussed above, examples of the present disclosure may include a computer-readable medium, which when executed by a processor may cause the processor to perform operations disclosed herein. According to examples of the present disclosure, executable code 645 includes, among others, a remote activation module 646 for activating a digital imaging functionality of a remote digital imaging computing system, and an imaging functionality control module 647 for controlling the imaging functionality of the remote imaging computing system. The imaging functionality control module 647 allows the remote digital imaging computing system to transmit images and other data to a control computing system and allows the control computing system to remotely control the imaging functionality of the remote imaging computing system to modify the digital image to be captured by the digital imaging computing system. The imaging functionality control module 647 also allows the remote capture of the digital image. Although shown as distinct modules, remote activation module 646 and the imaging functionality control module 647 may be implemented as a single processing module or multiple processing modules that incorporate and effect other processes.

Methods according to the above-described examples may be implemented using computer-executable instructions that are stored or otherwise available from computer readable media. Such instructions may include, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. Therefore, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Devices implementing methods according to the examples of the disclosure may include hardware, firmware and/or software, and may take any of a variety of form factors. Typical examples of such form factors include laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

While various items are illustrated as being stored in memory or on storage while being used, these items or portions of them may be transferred between memory and other storage devices for purposes of memory management and data integrity. Alternatively, in other examples some or all of the software modules and/or systems may execute in memory on another device and communicate with the illustrated computing systems via inter-computer communication. Thus, in some examples, some or all of the described techniques may be performed by hardware means that include one or more processors and/or memory and/or storage when configured by one or more software programs (e.g., a software program to effect the remote activation and use of a cell phone camera for taking selfies) and/or data structures, such as by execution of software instructions of the one or more software programs and/or by storage of such software instructions and/or data structures. Furthermore, in some examples, some or all of the systems and/or modules may be implemented or provided in other manners, such as by consisting of one or more means that are implemented at least partially in firmware and/or hardware (e.g., rather than as a means implemented in whole or in part by software instructions that configure a particular processor), including, but not limited to, one or more application-specific integrated circuits (ASICs), standard integrated circuits, controllers (e.g., microcontrollers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory, a network storage device, or a portable media article to be read by an appropriate drive or via an appropriate connection. The systems, modules and data structures may also in some examples be transmitted via generated data signals on a variety of computer-readable transmission mediums, including wireless-based mediums, and may take a variety of forms. Such computer program products may also take other forms in other examples. Accordingly, examples of the present disclosure may be practiced with other computer system.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

While the above description is a complete description of specific examples of the disclosure, additional examples are also possible. Thus, the above description should not be taken as limiting the scope of the disclosure which is defined by the appended claims along with their full scope of equivalents.

The invention claimed is:

1. A system for remotely capturing a selfie image on a cell phone comprising:
   a cell phone having a camera activated by pressing a camera activation button of the cell phone;
   a cell phone stand for supporting the cell phone, the cell phone stand including a cell phone camera activation mechanism to press the camera activation button of the cell phone and actuators to adjust the position of the cell phone; and
   a remote activation device communicatively coupled to the cell phone stand, the remote activation device to remotely activate the cell phone camera activation mechanism to press the camera activation button of the cell phone.

2. The system of claim 1 wherein the cell phone stand includes a digital imaging and transmission functionality to obtain a digital image to be captured by the camera of the cell phone and transmit the digital image to be captured by the camera of the cell phone to the remote activation device and wherein the remote activation device includes a display screen for displaying the digital image to be captured by the camera of the cell phone.

3. The system of claim 2 wherein the remote activation device controls the camera of the cell phone to modify the digital image to be captured by the camera of the cell phone.

4. The system of claim 3 wherein the cell phone camera activation mechanism includes a capacitive stylus to press the camera activation button of the cell phone.

5. A non-transitory, computer-readable storage medium having stored thereon instructions for remotely capturing a digital image which, when the instructions are executed by a processor, cause the processor to:
   communicatively couple a control computing system to a stand for supporting a digital imaging computing system, the digital imaging computing system having a digital imaging functionality activated by an activation button on the digital imaging computing system, the stand including a digital imaging functionality activation mechanism and actuators to adjust the position of the digital imaging computing system; and
   remotely activate and control the digital imaging functionality activation mechanism to press the activation button on the digital imaging computing system.

6. The non-transitory, computer-readable storage medium of claim 5 wherein the control computing system is a first cell phone and the digital imaging computing system is a second cell phone.

7. The non-transitory, computer-readable storage medium of claim 6 wherein the second cell phone is supported by a cell phone stand, the cell phone stand including a digital imaging and transmission functionality to obtain and transmit a digital image to be captured by a camera of the second cell phone, actuators to adjust the position of the second cell phone, the actuators controlled by the first cell phone.

8. A system for remotely capturing a selfie image on a cell phone, the cell phone having a camera activated by pressing a camera activation button of the cell phone, comprising:

a cell phone stand including cell phone positioning functionality, cell phone camera activation functionality to press the camera activation button of the cell phone, and a computing system for receiving and processing instructions to control the cell phone positioning functionality and the cell phone camera activation functionality; and a remote activation device communicatively coupled to the computing system of the cell phone stand for transmitting instructions to control the cell phone positioning functionality and the cell phone camera activation functionality.

9. The system of claim 8 wherein the cell phone stand includes one or more portions for supporting the cell phone, and the cell phone positioning functionality includes one or more actuators on each portion to adjust a position of the cell phone.

10. The system of claim 9 wherein the cell phone camera activation functionality includes a capacitive stylus for pressing the camera activation button of the cell phone.

* * * * *